Patented Nov. 12, 1929

1,735,558

UNITED STATES PATENT OFFICE

MALCOLM PHILLIP YOUKER, OF BARTLESVILLE, OKLAHOMA

RECTIFYING PROCESS

Application filed July 15, 1924. Serial No. 726,106.

My invention relates to improvements in the art of distilling hydrocarbon liquids and has special reference to improvements in the art of fractionally distilling petroleum. An object of my invention is to secure a maximum degree of fractionation by a single distillation. By my new process, this and other desirable advantages are obtained.

My invention will be more fully understood from the following description taken in connection with the accompanying drawings, in which:—

Figure 1:
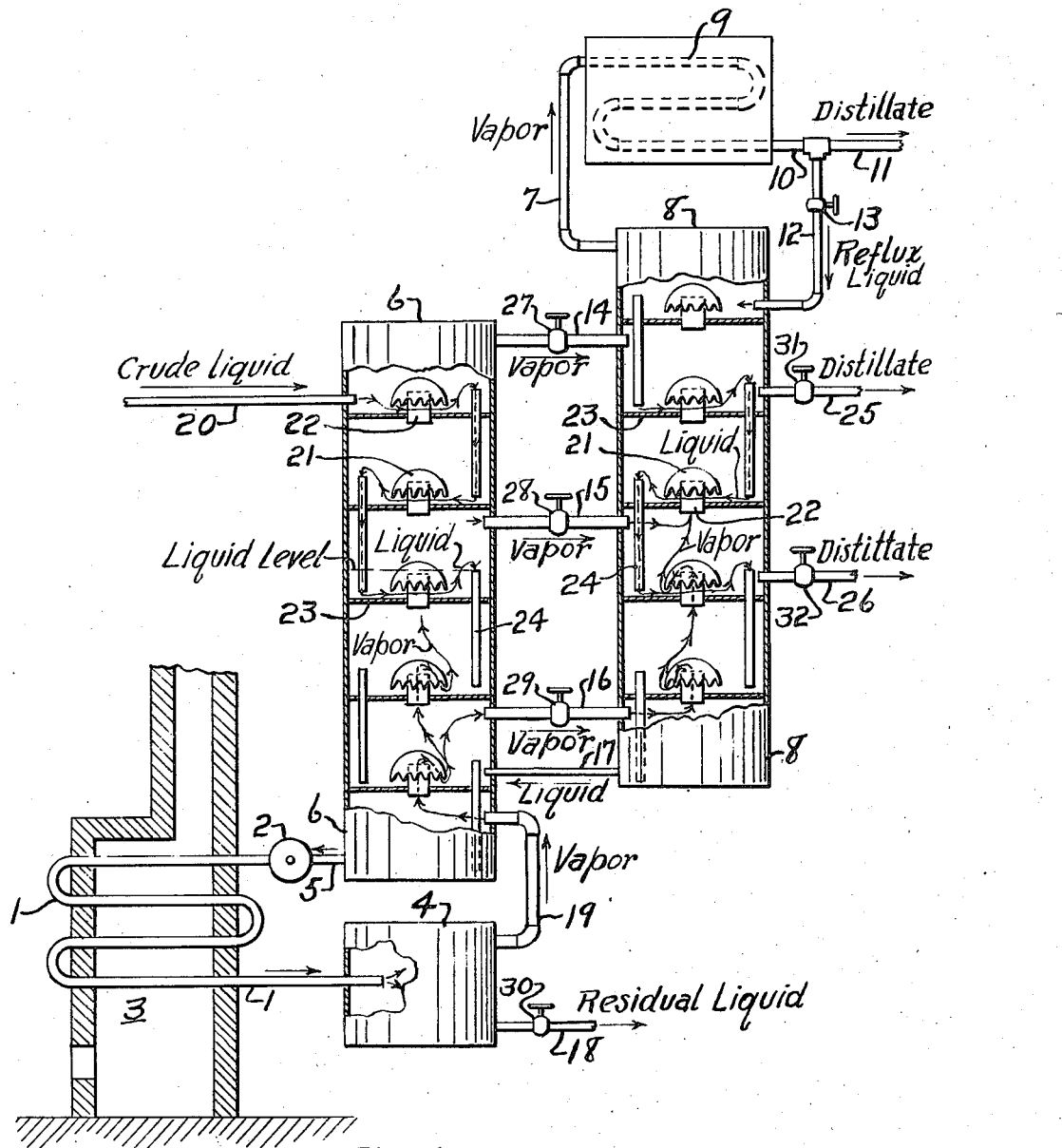
Figure 2:
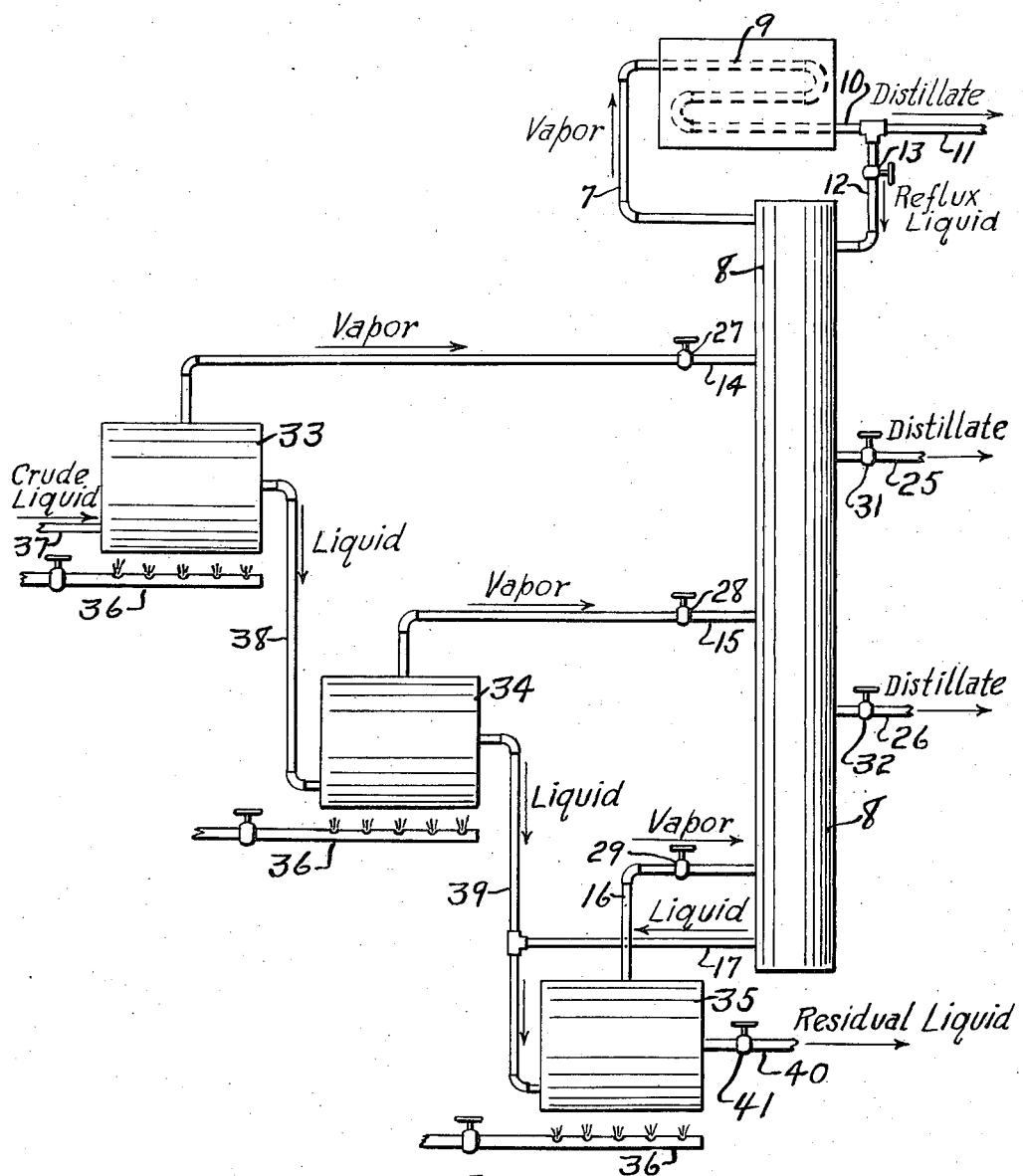

Figures 1 and 2 each illustrate diagrammatically in side elevation an apparatus by which my new process may be carried out.

Referring to Figure 1, the numeral 1 designates a heating tube which leads from a pump 2 through a furnace 3 into a vapor liquid separator 4. The pump 2 operates to pump through the heating coil into the vapor liquid separator. A pipe 5 leads from the liquid outlet at the bottom of a bubbling type fractionating column 6 to the intake of the pump 2. A pipe 7 leads from the vapor outlet at the top of a bubbling type fractionating column 8 into a condenser worm 9. A pipe 10 leads from the outlet of condenser worm 9 and is split into two pipes 11 and 12. Pipe 11 leads to storage tanks. Pipe 12 in which is mounted a valve 13 leads into the top of fractionating column 8. Pipes 14, 15 and 16 are tapped into fractionating column 6 at successively lower elevations in the order mentioned and lead into fractionating column 8 at successively lower points in the order mentioned. A pipe 17 leads from the liquid outlet at the bottom of fractionating column 8 into the side of fractionating column 6. A pipe 18 leads from the bottom of vapor liquid separator 4 to storage tanks. A pipe 19 leads from the top of vapor liquid separator 4 into the vapor inlet at the bottom of fractionating column 6. A pipe 20 which is in communication with a supply of oil which is to be distilled leads into the top of fractionating column 6. The sides of the fractionating columns 6 and 8 are shown broken away revealing bubbling caps 21 which are mounted over nipples 22 which are in turn mounted over holes through horizontal plates 23. Overflow tubes 24 which pierce plates 23 extend above the lower edge of bubble caps 21 and lap each other in a vertical direction. Pipes 25 and 26 are tapped into the side of fractionating column 8 at points immediately above horizontal plates 23 and lead through coolers to storage tanks. Valves 27, 28, 29, 30, 31 and 32 are mounted in pipes 14, 15, 16, 18, 25 and 26 respectively.

The apparatus shown in Figure 1 will be operated to carry out my new process, as follows:

Liquid which is to be fractionally distilled will be charged into the top of fractionating column 6 through pipe 20 and will flow thence downward through fractionating column 6 by way of the overflow tubes 24 and thence through pipe 5 to pump 2 and will be pumped by pump 2 through the heating tube 1. The liquid which will flow through heating tube 1 will be partially vaporized in this heating tube and the resulting vapor and liquid will flow into the vapor liquid separator 4 from which liquid will be withdrawn through pipe 18. The temperature in the furnace 3 will be regulated so that any desired part of the liquid which will flow through heating coil 1 will be delivered into the vapor liquid separator in the vapor phase. The vapor which will flow from the heating tube into the vapor liquid separator will flow thence through pipe 19 into the bottom of fractionating column 6. The vapor which will enter the bottom of fractionating column 6 will flow upward through fractionating column 6 by way of nipples 22 and thence through pipes 14, 15 and 16 into fractionating column 8 and thence upward through fractionating column 8 by way of nipples 22 and thence from fractionating column 8 through pipe 7 into condenser worm 9. The vapor which will flow into condenser worm 9 will be condensed in this condenser worm and the resulting condensate will flow from condenser worm 9 through pipe 10 and will be split into two streams, one of which streams will flow through pipe 11 to storage tanks, and the other one of which streams will flow through pipe 12 into the top of fractionating column 8 and thence downward through fractionating column 8 by way of overflow tubes 24. Fractions of the stream of liquid which will flow downward through the fractionating column 8 will be withdrawn through the pipes 25 and 26. Any liquid not otherwise withdrawn from fractionating column 8 will collect at the bottom of fractionating column 8 and flow thence through pipe 17 into fractionating column 6 and mix with the stream of liquid which will be charged downward through fractionating column 6. As the upper extremities of the overflow tubes 24 extend above the plates 23 and above the lower edges of the bubbling caps 21, a pool of the liquid which will flow downward through overflow tubes will gather on each of the plates 23 and vapors which will rise through nipples 22 and flow under the edges of caps 21, will bubble through these pools of liquid. As a result of the contact in fractionating column 6, between the oil which will be charged downward through fractionating column 6 and the vapor which will be evolved by heating coil 1 and which will flow upward through fractionating column 6, rectified fractions of the oil which will be charged downward through fractionating column 6 will be simultaneously delivered in the vapor phase, from fractionating column 6 through pipes 14, 15 and 16. The vaporous fractions simultaneously delivered from the fractionating column 6 at progressively lower elevations will be progressively less volatile and the volatility of each vaporous fraction thus delivered will be regulated through varying the relative quantities of vapor which will be delivered in the various fractions by manipulating the valves 27, 28 and 29. Increasing the quantity of vapor delivered from the fractionating column 6 at a higher point along the side of fractionating column 6 and simultaneously decreasing, in a like amount, the quantity of vapors delivered from fractionating column 6 at lower points will decrease the volatility of the vapor delivered at the higher point and vice versa. As a result of the contact in fractionating column 8 between the stream of condensate which will be charged downward through fractionating column 8 and the vapors which will flow upward through fractionating column 8, rectified fractions of these vapors may be simultaneously withdrawn in liquid form, from fractionating column 8 through pipes 25 and 26. The volatility of liquid fractions thus drawn from fractionating column 8 will be regulated through manipulation of valves 31 and 32 to vary the quantities of liquid drawn through pipes 25 and 26. The volatility of the condensate obtained from condenser worm 9 will be regulated through manipulating valve 13 to vary the quantity of this condensate which will be charged into the top of the fractionating column 8 through pipe 12. Increasing the quantity of condensate delivered from the condenser worm 9 into the top of the fractionating column 8 will increase the volatility of the condensate obtained from condenser worm 9 and vice versa. Increasing the quantity of liquid drawn through pipe 25 or through pipe 26 by opening valve 31 or 32 will decrease the volatility of the distillate thus obtained or vice versa. The distillates drawn from the apparatus through pipes 11, 25, and 26 will be successively less volatile in the order in which the pipes through which these distillates will be drawn are mentioned. The volatility of the vaporous fractions which will be delivered from fractionating column 6 into fractionating column 8 will be so regulated that no vapor which is less volatile than a distillate which is to be drawn from fractionating column 8 will be delivered into fractionating column 8 above the point at which such distillate is to be drawn from fractionating column 8.

As an example of the manner in which this apparatus may be operated, we will assume that crude petroleum which is to be separated into gasoline, kerosene, gas oil and fuel oil is charged to the apparatus through the pipe 20. The furnace temperature would be regulated so that sufficient heat would be supplied to the oil passed through the heating coil to cause all of the crude oil, except the fuel oil, to vaporize and pass through the apparatus as outlined above, while the fuel oil would be drawn from the vapor liquid separator 4 through the pipe 18. The apparatus would be regulated as outlined above and the gasoline, kerosene and gas oil would be drawn from the apparatus through pipes 11, 25 and 26, respectively.

Referring to Figure 2, the numerals 33, 34 and 35 designate closed horizontal cylindrical vessels which are mounted at successively lower elevations in the order in which they are mentioned and under each of which is mounted a gas burner 36. A pipe 37 which is in communication with a supply of liquid which is to be distilled leads into the vessel 33; a pipe 38 leads from vessel 33 into vessel 34; a pipe 39 leads from vessel 34 into vessel 35 and a pipe 40 in which is mounted a valve 41 leads from vessel 35 to storage tanks. Other parts of the apparatus shown in Figure 2 are designated by numerals which have the same reference as in Figure 1, except that the pipes 14, 15 and 16 lead from the upper part of the closed vessels 33, 34 and 35 shown in the Figure 2 respectively instead of from the fractionating column 6 as shown in Figure 1, and that the pipe 17 leads into pipe 39 shown in Figure 2 instead of into the fractionating column 6 shown in Figure 1. The internal construction of the fractionating column 8 shown in Figure 2 is similar in all respects to that of the fractionating column 8 shown in Figure 1.

The apparatus shown in Figure 2 will be operated to carry out my new process in the same manner as that in which the apparatus shown in Figure 1 will be operated for that purpose, except that the liquid which is to be distilled will be passed through vessels, 33, 34 and 35 in series in the order mentioned by means of pipes 37, 38 and 39, and each of these vessels will be heated by means of gas burners 36, 36 and 36 to such an extent that vaporous fractions of the liquid which is to be distilled will be formed in and caused to flow from each of the vessels 33, 34 and 35 through the pipes 14, 15 and 16 respectively. Vapors produced in vessels 33, 34 and 35 will be less volatile in the order in which the vessels in which they are produced are mentioned and the volatility of vapors produced in these vessels will be regulated by regulating the gas burners 36 to impart more or less heat to these vessels. Increasing the heat imparted to one of the vessels 33, 34, or 35 will decrease the volatility of the vapor produced in that vessel and vice versa. The valves 27, 28 and 29 will be utilized to regulate the liquid levels in the vessels 33, 34 and 35 shown in Figure 2 by means of manipulating them to equalize the pressure maintained in these vessels. Residual liquid will be withdrawn from vessel 34 through pipe 39. The direction of vapor and liquid flow is indicated on the drawing by arrows. It will be found that by this method of distillation, exceptionally well rectified, fractions of a variable boiling point mixture of liquids, such as crude petroleum may be obtained by a single distillation.

While I have described in detail two methods of carrying out my new process, it is to be understood that I do not limit myself to these details except in so far as I have so limited myself in the claims which are made as a part of this specification and in which it is my intention to claim all novelty inherent in my new process. As an example of a change in the detail manner in which I will carry out my new process, I may in some cases use a series of heating coils and separators similar to those shown in Figure 1 in place of the series of stills shown in Figure 2.

I claim:—

1. A method of distilling a liquid composed of several hydrocarbons which consists in fractionally vaporizing said liquid under countercurrent contact between liquid and vapor, separately removing a plurality of said vaporous fractions, and simultaneously rectifying and thus fractionally condensing a part of said fractions by introducing the same at spaced elevations into the same stream of downwardly flowing reflux, and separately removing said several condensates.

2. The process for separating fractions which are of comparatively less complex composition from hydrocarbon liquids which are of comparatively more complex composition which consists in causing a stream of said complex hydrocarbon liquids to flow counter-current to and in contact with a stream of hydrocarbon vapor, causing hydrocarbon vapors which at intermediate stages along said line of contact result from said contact, to make contact at spaced elevations with a second stream of downwardly flowing hydrocarbon liquid to rectify the last mentioned vapors, and directly withdrawing, as products of the process, liquids which result from said contact between said second stream of liquid and said hydrocarbon vapors.

3. The process of separating fractions of comparatively less complex composition from hydrocarbon liquids of comparatively more complex composition, which consists in introducing the latter into the upper portion of a fractionation zone, fractionally vaporizing said more complex liquid in said zone under counter-current contact between liquid and vapor, separately removing a plurality of vaporous fractions at different elevations from the zone of fractionation, and rectifying said vaporous fractions by introducing the same at spaced elevations into a downwardly flowing stream of reflux in a separate fractionation zone.

4. The process for separating fractions of comparatively less complex composition from hydrocarbon liquids of comparatively more complex composition which consists in causing a stream of hydrocarbon liquid to flow countercurrent to and to make contact with a stream of hydrocarbon vapor to produce a plurality of vaporous fractions of different volatilities, separately removing a plurality of said vaporous fractions from the sphere of vaporization, simultaneously rectifying and thus fractionally condensing a part of said fractions by contact at spaced elevations with a single stream of downwardly flowing reflux, and separately removing said fractional condensates.

5. The process for the fractional distillation of hydrocarbon liquids, which consists in introducing a stream of said liquid into the upper portion of a rectification zone and permitting said stream to flow downwardly counter-current to, and in contact with a stream of hydrocarbon vapor, vaporizing the liquid remaining after said contact, said stream of vapor being at least partially composed of vapor resulting from vaporization of hydrocarbon liquid which remained after a previous similar contact, separately removing hydrocarbon vapors at intermediate stages along said line of contact, and introducing the same at spaced elevations into a separate second rectification zone, causing the last mentioned vapors in the second zone to flow counter-current to, and in contact with a second stream of hydrocarbon liquid, directly withdrawing as a product of the process, hydrocarbon liquid which results from said contact between the second stream of liquid and said vapors, and condensing vapors which remain after the second contact.

6. A process for separating fractions which are of comparatively less complex composition from hydrocarbon liquids which are of comparatively more complex composition which consists in vaporizing said more complex liquid into several fractions by causing a stream of the more complex liquid to flow countercurrent to and in contact with a stream of hydrocarbon vapors, withdrawing the said vaporous fractions separately from the sphere of contact at different elevations along the line of contact, vaporizing a portion of the hydrocarbon liquid which remains after said contact, introducing said withdrawn vaporous fractions at different elevations into a single stream of reflux to rectify all of said vaporous fractions, and withdrawing less complex fractions in liquid form at different points from said stream of reflux.

7. The process for the fractional distillation of crude hydrocarbon liquids which consists in causing a stream of crude hydrocarbon liquid to flow counter current to and in contact with a stream of hydrocarbon vapor, vaporizing liquid which results from said contact between said crude liquid and said vapor, withdrawing directly from said stream of vapor a series of successively less volatile vaporous fractions, causing a second stream of hydrocarbon liquid to successively make contact with and to flow counter current to and in contact with successively less volatile vaporous fractions which have been produced as described, condensing vapors which result from said contact between said second stream of hydrocarbon liquid and said vaporous fractions, withdrawing liquid products of the process directly from said second stream of hydrocarbon liquid, and withdrawing the liquid residue of the process, said stream of hydrocarbon vapor being vapors produced by the said vaporization of said liquid and said second stream of hydrocarbon liquid being condensate produced by said condensation of said vapors.

8. The process of separating originally existant fractions of comparatively simple composition from hydrocarbon liquid of comparatively complex composition, which consists in continuously circulating an endless stream of hydrocarbon material, a part of the course of said endless stream of hydrocarbon material being through an elongated restricted passage-way, continuously adding hydrocarbon liquid to said stream from a second stream, causing the material of said endless first stream, together with the added hydrocarbon liquid, to continuously enter said elongated restricted passage-way in liquid form, continuously vaporizing a part of said endless stream of hydrocarbon material in said passage-way, causing portions of said stream, after having passed through said passage-way, and while in the vapor form, to continuously make counter-current contact with said second stream of hydrocarbon liquid, thereby continuously changing the form of said part of the endless stream from vapor to liquid, and changing the form of a part of the said second stream of hydrocarbon liquid to vaporous fractions, withdrawing said vaporous fractions from the sphere of contact, introducing the same at various elevations into a stream of downwardly flowing reflux, and withdrawing hydrocarbon fractions in liquid form at various elevations from the stream of reflux.

9. A method of distilling a liquid composed of several hydrocarbons which consists in fractionally vaporizing said liquid under counter current contact between liquid and vapor, removing a heavy fraction from the sphere of vaporization in liquid form, separately removing a plurality of lighter fractions in vaporous form from the sphere of vaporization, and simultaneously rectifying and thus fractionally condensing a part of said lighter vaporous fractions by introducing the same at spaced elevations into a downwardly flowing stream of reflux, and separately removing the condensates.

10. A method of distilling a liquid composed of several hydrocarbons, consisting in introducing said liquid into the top portion of a first rectification zone, permitting the liquid to flow downwardly therein, applying heat to the liquid in the lower portion of the zone to cause a stream of vapors to rise in the zone and move in counter-current contact with the downwardly flowing stream of liquid, separately withdrawing vaporous fractions at spaced elevations from the stream of vapor in the order of their volatilities, the most volatile being withdrawn at the highest elevation, and the least volatile being withdrawn at the lowest elevation, introducing these separate vaporous fractions in the same order at spaced elevations, into a second separate zone, permitting the vaporous fractions introduced into the second zone, to rise in the latter, cooling the vapors at the upper portion of the second zone to condense some of the vapors and form a reflux stream, permitting this reflux stream to flow downwardly in the second zone counter-current with the rising vaporous fractions, to rectify the latter, and withdrawing a product of the distillation from the second zone.

11. The process for separating originally existant fractions of comparatively simple compositions from hydrocarbon liquid of comparatively complex composition, which consists in continuously circulating a stream of hydrocarbon material through a passageway, continuously vaporing a portion of said stream in said passageway, causing the thus vaporized portion of said stream to split into two parts, and these parts to continuously make counter-current contact with two dissimilar streams of hydrocarbon liquid in separate zones, continuously adding hydrocarbon liquid to one of said two dissimilar streams, condensing vapors which result from said contact between said vaporized portion of said stream of circulated hydrocarbon material and said streams of hydrocarbon liquid, and withdrawing from the sphere of the process, a part of the circulated liquid stream.

MALCOLM PHILLIP YOUKER.